UNITED STATES PATENT OFFICE.

FREDERICK H. SNYDER, OF JERSEY CITY, NEW JERSEY, ASSIGNOR OF ONE-THIRD TO GEORGE W. RICHARDSON AND MARTIN LUSCOMB, BOTH OF BOSTON, MASSACHUSETTS.

ANTI-FRICTION LUBRICANT.

SPECIFICATION forming part of Letters Patent No. 357,106, dated February 1, 1887.

Application filed October 22, 1883. Renewed May 15, 1885. Serial No. 165,679. (No specimens.)

*To all whom it may concern:*

Be it known that I, FREDERICK H. SNYDER, a citizen of the United States, residing at Jersey City, in the county of Hudson and State of New Jersey, have invented certain new and useful Improvements in Anti-Friction Lubricants, of which the following is a specification.

My invention is designed to utilize the anti-friction properties of a material known as "gas-carbon" obtained from gas-retorts.

In my application for Letters Patent for "Process of treating gas-carbon and compounds therefrom," allowed June 15, 1883, Serial No. 95,045, I have described a process for separating and obtaining a product from what is commonly known as "gas-carbon," by which I am enabled to produce a carbon of superior quality by eliminating therefrom the impurities that exist in the crude material when it is taken from the retorts. This product I use as the basis or component part for manufacturing a compound for anti-friction purposes.

It is known that the material deposited and found adherent to the interior of gas-retorts is mainly composed of a carbon that differs in its characteristics from other forms of carbon. This material I have found to possess great anti-friction properties, and for such purposes attains as nearly as possible the qualities of the diamond or pure carbon, and when separated from the baser or coarser ingredients that it contains when taken from gas-retorts is valuable for the purposes of my invention. Its density, when properly prepared with a smooth surface, precludes friction or abrasion with or by other bodies. Its specific gravity is less than any other substance of like density, which increases its value for bearing where it is an object to decrease the weight of machinery.

In carrying my invention into effect I take pulverized gas-carbon, that from which the impurities have been eliminated by the process described in my allowed application before mentioned I prefer to use.

In preparing a compound of this material for anti-friction purposes I may make use of a variety of substances for cementing the same together; but do not limit myself to any particular kind, as there are many well-known substances that may be used for this purpose, and the purposes for which the anti-friction compound is desired will require different binders or cementing substances in its construction.

For making a compound for stationary bearings or machinery where little strain or shock is imparted by its motion I have found that asphalt or coal-tar can be used to advantage. In this instance I mix from one to two per cent. of this substance with the pulverized gas-carbon and press the mixture in molds by hydraulic or other pressure into the desired shapes. After taking it from the molds I place it in an oven or kiln and subject it to the greatest heat I can attain, until all the volatile hydrocarbon contained in the cementing material is driven off. This leaves the compound compact and now ready for use.

In making a compound requiring tenacity and flexibility I prefer to use hard rubber as a binder. For such purposes I use a larger proportion of the cementing material. From five to ten per cent. of the whole compound may be used, according to the kind of purpose it is desired to apply or use the compound. In the latter instance the rubber or other analogous binder may be mixed with the carbon in the same manner as asphalt or coal-tar; but only heat sufficient to vulcanize the cementing material should be applied to the compound. By suitable apparatus the heat may be applied while the compound is in the molds under pressure, or in an oven after it has been removed. Metal—such as lead or brass or copper turnings or filings—may also be used with good effect. In such cases only heat sufficient to melt or fuse the material used for the cementing purposes should be applied.

The uses to which an anti-friction compound or material such as I have described may be applied are numerous. For journal-bearings in marine locomotives or stationary machinery its uses are many. It may also be used for face-plate bearings on cross-heads, step-bearings, and spindle-orifices in spinning-machines and friction-rings for looms. It is also applicable for rings for steam or hot-air cylinders, and piston or valve packing for the same, as its expansion or contraction under heat or cold is scarcely appreciable. It may be used for many other purposes requiring a substance not easily affected by heat and cold or friction.

Having thus described my invention, what I claim as new, and desire to secure by Letters Patent, is—

In the manufacture of lubricating compounds for anti-friction purposes, gas-carbon as an element used in a plastic or hard state, either with or without cementing material, substantially as described.

In testimony whereof I affix my signature in presence of two witnesses.

FREDERICK H. SNYDER.

Witnesses:
  GEORGE W. JOHNES,
  D. W. BLISS.